Jan. 8, 1935.  C. T. WALTER  1,986,868
TREATMENT OF MEAT
Filed April 1, 1932   2 Sheets-Sheet 1
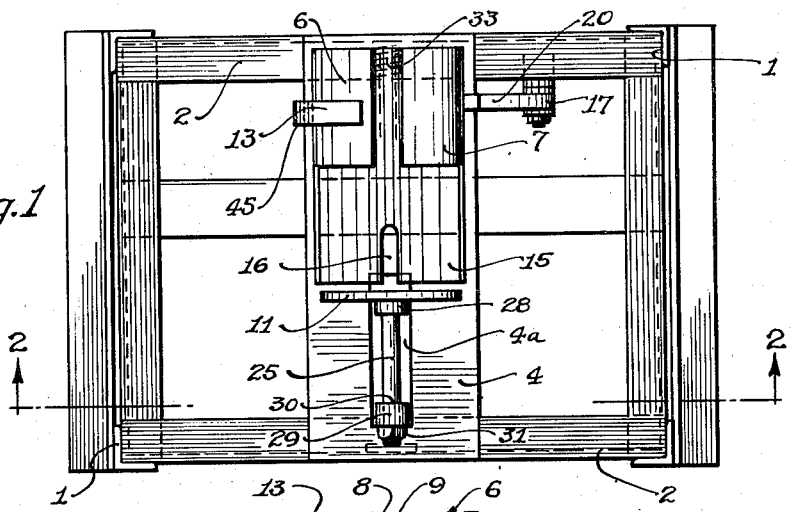
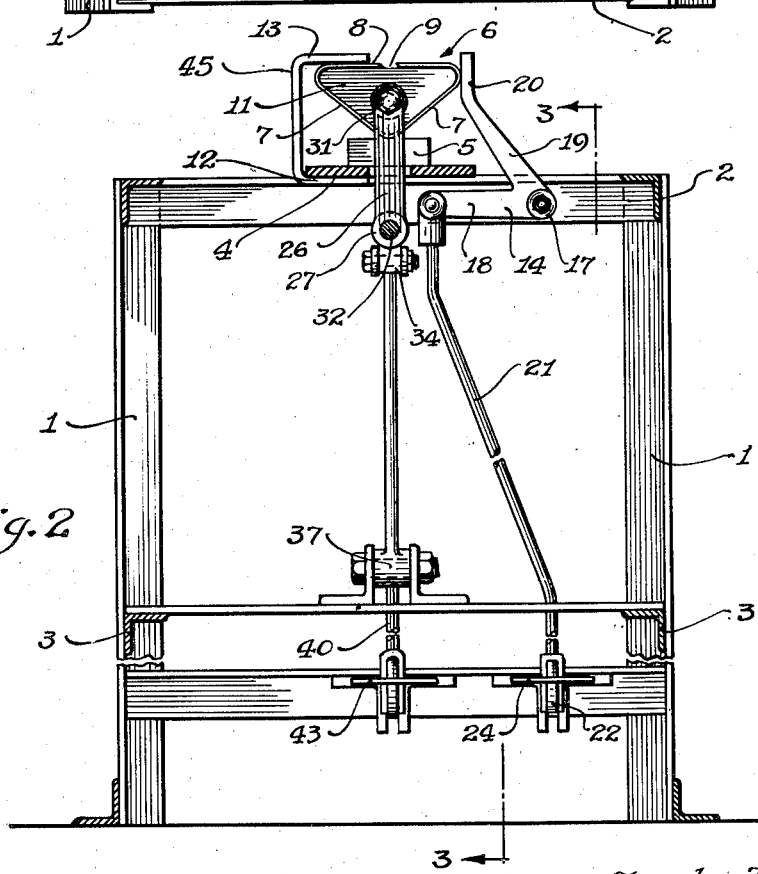
Inventor
Charles T. Walter
WITNESS
By
Attorney Jan. 8, 1935. C. T. WALTER 1,986,868
TREATMENT OF MEAT
Filed April 1, 1932  2 Sheets-Sheet 2

Inventor
Charles T. Walter

Patented Jan. 8, 1935

1,986,868

UNITED STATES PATENT OFFICE 1,986,868

TREATMENT OF MEAT

Charles T. Walter, Chicago, Ill., assignor to Swift and Company, Chicago, Ill., a corporation of Illinois Application April 1, 1932, Serial No. 602,452

5 Claims. (Cl. 99—11)

The invention relates to a method of packaging sausage meat specialty and other products.

One of the objects of the present invention is to provide a method whereby a piece of sausage meat or other product of the desired cross sectional shape and weight may be inserted in a tubular flexible artificial casing, producing a package of sausage meat specialty or other product, in which the elastic properties of both the casing material and the meat product will be utilized in maintaining a close tight contact between the product and the artificial casing.

Another object of the invention is to process the sausage meat specialty to coagulate the same to enable it to be conveniently cut into pieces of desired weight and to be readily inserted in the artificial casing in the form of either a single piece or in slices, and after the insertion of the meat product in the artificial tubular casing to effect a sterilization of the meat product and the sealing of the package so that the meat product may be preserved practically indefintely in the condition in which it is packaged.

Other objects of the invention will be apparent from the description and claims which follow. A suitable apparatus for carrying out the method of the present application is described and claimed in my divisional application, Serial No. 650,866, entitled Apparatus for the treatment of meat, filed January 9, 1933. In order to illustrate the method of the present application the apparatus described and claimed in my said divisional application is shown in the drawings accompanying this specification.

In the drawings:—

Figure 1 is a plan view of a sausage meat specialty packaging apparatus.

Fig. 2 is a section on line 2—2 of Fig. 1.

Figure 3:
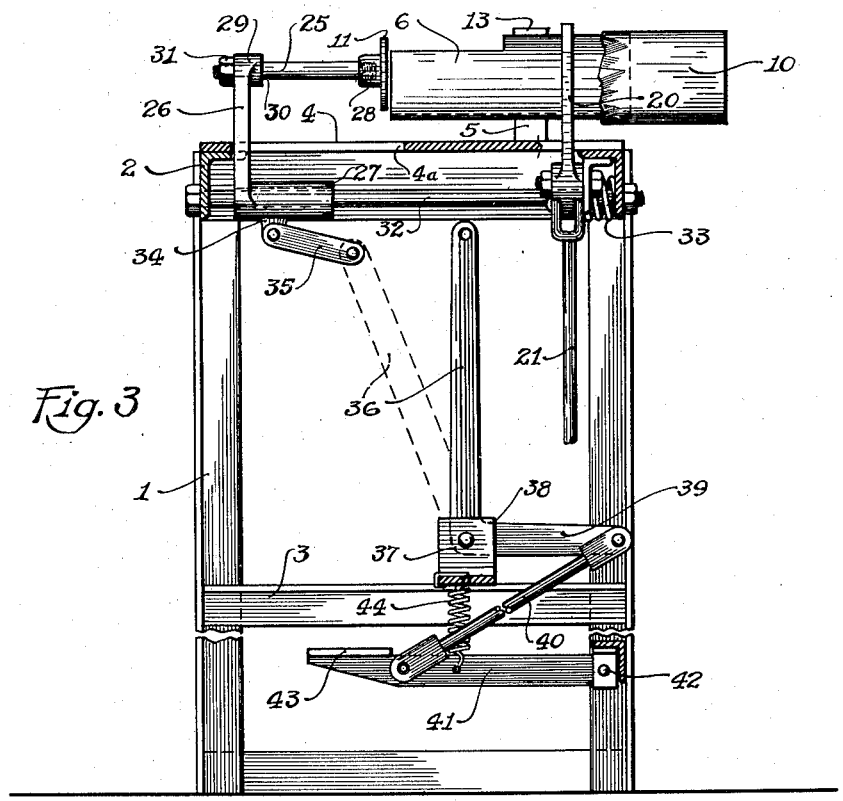
Fig. 3 is a vertical sectional view taken substantially on the line 3—3 of Fig. 2.
Figure 4:
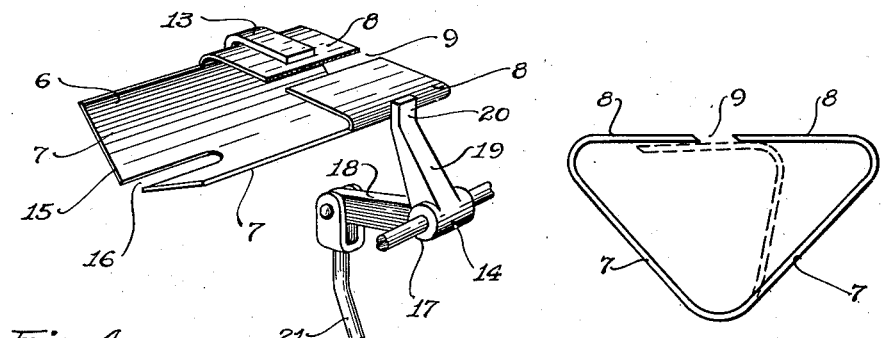
Fig. 4 is a detail perspective view of the flexible nozzle.

The packaging apparatus comprises in its construction a supporting frame comprising vertical corner posts 1 of angle iron or other suitable material, angle frame members 2 and upper and lower horizontal connecting frame members 3 and 4, but any other suitable form of supporting frame may, of course, be employed.

The supporting frame is provided at its top with a central oblong platform 4 extending from the front to the back of the frame, as clearly illustrated in Fig. 1 of the drawings, and provided at its rear portion with a block 5. The block 5 which is disposed transversely of the platform 4 supports a flexible nozzle 6 constructed of resilient sheet metal or other suitable material and composed of inclined upwardly diverging side walls 7 and horizontal top wall sections 8 extending inwardly from the side walls at the tops thereof and spaced apart at the center of the top of the flexible nozzle to provide an intervening space 9 which permits the flexible nozzle to be compressed and collapsed, as illustrated in dotted lines in Fig. 5 of the drawings. This will enable a flexible tubular artificial casing 10 to be placed on the rear end of the nozzle in a position to have a piece of sausage meat specialty or other product inserted in it by means of a plunger 11, as hereinafter fully explained. The flexible casing receiving nozzle is substantially triangular in cross section with rounded corners and one side of the nozzle is secured to a bracket 45 approximately U-shaped and composed of upper and lower arms and a vertical connnecting portion, the lower arm 12 being secured to the lower face of the platform and the upper arm 13 being extended over and secured to the adjacent top wall section or portion 8 of the flexible nozzle. The bracket 45 supports one side of the flexible nozzle while the other side is being operated on by a nozzle collapsing lever 14.

The nozzle which is disposed in the horizontal position above and centrally of the rear portion of the platform 4 is provided at the front with side wall extensions 15 forming an open upper portion and diverging upwardly and spaced apart at their lower edges to provide an intervening space 16 to permit the passage of the plunger mechanism, as hereinafter fully explained.

Figure 5:
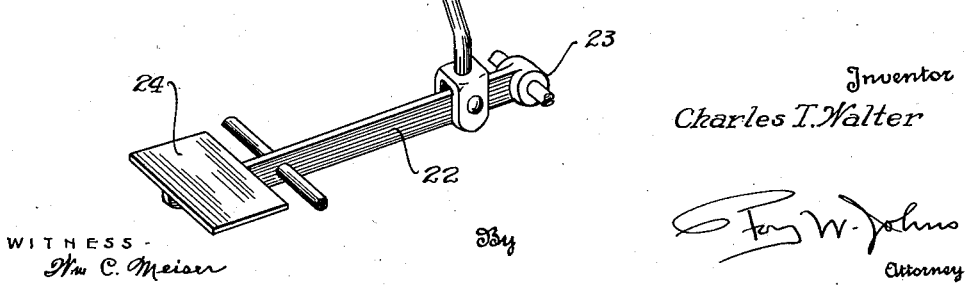
Fig. 5 is an end elevation of the flexible nozzle showing the same in normal position in full lines and collapsed in dotted lines.

The nozzle collapsing lever 14 consists of an angle lever fulcrumed at its angle at 17 on the main frame as having a lower approximately horizontal arm 18 and an upper inclined arm 19 provided at the top with an approximately vertical nozzle engaging extension 20 located opposite the arm 13 of the bracket and bearing against the adjacent side of the flexible nozzle and adapted to be moved inwardly with respect to the nozzle to collapse the same from the normal full line position illustrated in Fig. 5 of the drawings to the dotted line position shown therein. When the collapsible nozzle is collapsed, as illustrated in dotted lines in Fig. 5, a piece of tubular flexible artificial casing may be readily fitted on the rear end of the nozzle and when the nozzle is released and permitted to expand through its resiliency to its normal position the tubular flexible casing will be stretched and placed under tension and will assume the triangular form of the flexible nozzle and be arranged in proper position to have a piece of triangular shaped meat sausage specialty or other product inserted in it for packaging the said product.

The lower arm 18 of the collapsing lever 14 is connected by a link 21 with a treadle lever 22 located at the lower portion of the main frame and extending from the front portion thereof to the back of the same. The treadle lever is fulcrumed at 23 on the main frame and is provided at the front end with a treadle 24 arranged in convenient position to be depressed by the foot of the operator. The front of the frame is open at the bottom to permit free access to the treadle lever. Any other suitable means, however, may, of course, be employed for collapsing the flexible nozzle.

The plunger 11 which is moved longitudinally of the flexible nozzle to force a piece of meat sausage specialty or other product into the flexible casing, is mounted on the inner end of a horizontal plunger rod 25 which is secured at its outer end to the upper end of a vertical arm 26 of a horizontal slide 27. The inner end of the plunger rod is preferably threaded into a boss or enlargement 28 of the plunger 11 when the outer end of the said plunger rod 25 is extended through an eye 29 of the upper end of the arm 26. The portion of the plunger rod which is inserted in the eye 29 is reduced to form a shoulder 30 for engaging the inner end of the eye 29 and is threaded to receive a nut 31 which engages the eye 29 at the outer end thereof. Any other suitable means, may, of course, be employed for connecting the plunger with the slide, and the platform 4 is provided with an opening 4a through which the said arm 26 of the slide passes.

The slide 27 is tubular and is mounted on a horizontal guide rod 32 located centrally beneath the platform 4 and suitably secured at its ends to the supporting frame at the front and back thereof. The slide is adapted to move longitudinally of the guide rod to carry the plunger from the front end of the open hopper portion of the flexible nozzle to the rear end of the said flexible nozzle for forcing the meat or other product from the said nozzle into the casing and in the rearward movement of the slide 27 and the plunger 11 the vertical arm of the slide moves in the opening in the bottom of the hopper portion of the flexible nozzle. A coiled spring 33 is preferably disposed on the guide rod 32 at the rear end thereof to form a cushion for the slide which is adapted to be rapidly actuated in the operation of the apparatus.

The slide 27 is provided at the bottom with a depending lug 34 which is connected by a link 35 with an upwardly extending arm 36 of a bell crank lever 37 fulcrumed at its angle 38 on the supporting frame and provided with a lower rearwardly extending arm 39 which is connected by a link 40 with a treadle lever 41. The upwardly extending arm 36 of the bell crank lever is relatively long and the rearwardly extending arm is relatively short, as clearly illustrated in Fig. 3 of the drawings. The link 40 extends downwardly and forwardly from the rear end of the short arm 39 of the bell crank lever to the front portion of the treadle lever 41. The treadle lever which is fulcrumed at its rear end at 42 on the main frame is provided at its front end with a treadle 43 adapted to be depressed by the foot of the operator.

The treadle lever 41 is connected between its ends with the lower end of the coiled spring 44 extending upwardly from the lever 41 and suitably connected at its upper end with a fixed portion of the frame. The spring 44 is distended when the treadle lever 41 is depressed and it is adapted to return the treadle lever to its normal horizontal position when relieved of the pressure of the foot of the operator.

The raw sausage meat is placed in suitable forms of the desired cross sectional shape and is cooked sufficiently to bring about coagulation. This coagulated material is then cut into pieces of the desired weight. These pieces are then placed one at a time in the open hopper-like extension of the flexible nozzle after a tubular flexible artificial casing has been placed on the rear end of the said flexible nozzle. The treadle 24 is depressed by the operator to collapse the flexible nozzle which will enable a piece of tubular flexible casing to be readily placed on the rear end of the nozzle. Pressure is then removed from the treadle 24 to permit the nozzle to expand and stretch the casing.

When a piece of the sausage meat, which may be formed of a single piece, or in slices, is placed in the open upper portion of the nozzle, the treadle 43 is depressed to operate the plunger which will force the sausage meat through the nozzle and into the casing. Experiments have indicated that the tubular artificial casing is stretched to approximately 20% and when the meat product is inserted in the casing and the casing removed from the flexible nozzle, the casing which is tensioned by such stretching will tend to compress the meat product and both the elastic properties of the meat product and the material of the flexible tubular casing will cooperate to maintain a constant firm contact between the casing and the meat product. Artificial synthetic casings possess this resiliency and are adapted to be stretched in this manner by the flexible nozzle.

The open ends of the casing are then folded over the sausage material and are held in this folded position by any suitable means during a second cooking operation made for the purpose of pasteurizing the product inside of the casing. The temperature and time of this pasteurizing cook may be varied to suit the nature of the sausage material being handled.

After the pasteurizing cook the packages are cooled. It has been found that the best results are obtained by cooling the packages in a bath of cold water. After cooling, the packages are allowed to drain or dry on their exterior surfaces, and paster labels are placed over the folded ends of each package. If smoking is desired, the product may be smoked either before or after it is inserted in the casing. When the labels have been applied the packages are finished and ready for packing into the desired shipping container. The product may be sliced before stuffing or introducing it into the flexible tubular casing and if desired, the individual slices may be separated by any suitable means to facilitate ready separation of each of the slices of a package.

What is claimed is:

1. The method of stuffing sausage meat which has been cooked to coagulate the same in a predetermined form, which comprises stretching and shaping a flexible tubular casing, and introducing the meat product into the casing while the same is in a stretched and distended condition to cause the casing when released to compress the meat product so that the elastic properties of the meat product and the casing will maintain a constant firm contact between the meat product and the casing.

2. The method of stuffing sausage meat which has been cooked to coagulate the same in a predetermined form, which comprises stretching and shaping a flexible tubular casing, introducing the meat product into the casing while the same is in a stretched and distended condition to cause the casing when released to compress the meat product so that the elastic properties of the meat product and the casing will maintain a constant firm contact between the meat product and the casing, and sterilizing the meat product while the same is in the casing.

3. The method of stuffing sausage meat which has been cooked to coagulate the same in a predetermined form, which comprises stretching and shaping a flexible tubular casing, introducing the meat product into the casing while the same is in a stretched and distended condition to cause the casing when released to compress the meat product so that the elastic properties of the meat product and the casing will maintain a constant firm contact between the meat product and the casing, sterilizing the meat product while the same is in the casing, and cooling the meat product and sealing the casing.

4. The method of stuffing sausage meat which has been cooked to coagulate the same in an angular form, which comprises stretching and shaping a flexible tubular casing, and introducing the meat product into the casing while the same is in a stretched and distended condition to cause the casing when released to compress the meat product so that the elastic properties of the meat product and the casing will maintain a constant firm contact between the meat product and the casing.

5. The method of stuffing sausage meat which has been cooked to coagulate the same in a triangular form, which comprises stretching and shaping a flexible tubular casing, and introducing the meat product into the casing while the same is in a stretched and distended condition to cause the casing when released to compress the meat product so that the elastic properties of the meat product and the casing will maintain a constant firm contact between the meat product and the casing.

CHARLES T. WALTER.